United States Patent [19]

Dauber

[11] Patent Number: 5,417,743

[45] Date of Patent: May 23, 1995

[54] SELF-ADHESIVE VENT FILTER AND ADSORBENT ASSEMBLY WITH A DIFFUSION TUBE

[75] Inventor: Edwin G. Dauber, Chesapeake City, Md.

[73] Assignee: W. L. Gore & Associates, Inc., Newark, Del.

[21] Appl. No.: 184,949

[22] Filed: Jan. 21, 1994

[51] Int. Cl.⁶ .................. B01D 53/04; B01D 53/22
[52] U.S. Cl. .............................. 96/13; 96/135; 55/274; 55/385.6; 55/502; 55/511; 360/97.02
[58] Field of Search ............ 55/385.6, 497, 502, 55/511, 274, 275; 96/11–13, 135; 360/97.02–97.04

[56] References Cited

U.S. PATENT DOCUMENTS

| | | | |
|---|---|---|---|
| 3,422,679 | 1/1969 | McGowan et al. | 55/502 X |
| 3,740,735 | 6/1973 | Gabor | 55/502 X |
| 3,822,601 | 7/1974 | Borom | 96/12 X |
| 4,329,722 | 5/1982 | West | 360/97.03 |
| 4,350,508 | 9/1982 | Santoro et al. | 96/135 |
| 4,657,570 | 4/1987 | Gronholz et al. | 55/385.6 |
| 4,684,381 | 8/1987 | Wasylyniuk | 55/502 X |
| 4,684,510 | 8/1987 | Harkins | 96/135 X |
| 4,857,087 | 8/1989 | Bolton et al. | 55/385.6 |
| 4,863,499 | 9/1989 | Osendorf | 55/316 |
| 4,889,542 | 12/1989 | Hayes | 55/385.6 X |
| 4,957,518 | 9/1990 | Brassell | 55/502 X |
| 5,030,260 | 7/1991 | Beck et al. | 55/316 |
| 5,108,474 | 4/1992 | Riedy | 55/497 X |
| 5,124,856 | 6/1992 | Brown et al. | 360/97.03 |
| 5,130,205 | 7/1992 | Vu et al. | 96/13 X |
| 5,163,870 | 11/1992 | Cooper | 55/385.6 X |
| 5,346,518 | 9/1994 | Baseman et al. | 55/385.6 X |

FOREIGN PATENT DOCUMENTS

| | | | |
|---|---|---|---|
| 0491175 | 6/1992 | European Pat. Off. . | |
| 55-119418 | 9/1980 | Japan | 96/13 |
| 9114496 | 10/1991 | WIPO . | |
| 9216281 | 10/1992 | WIPO . | |

*Primary Examiner*—Robert Spitzer
*Attorney, Agent, or Firm*—Dena Meyer Weker

[57] ABSTRACT

A self-adhesive vent filter adsorbent assembly with diffusion tube is provided for removing gaseous contaminants from an enclosure comprising a layer of polymer film forming a diffusion tube, two adhesive layers, at least one filtration layer and optionally an absorbent layer. An outside mounting assembly is also provided.

31 Claims, 7 Drawing Sheets

SELF-ADHESIVE VENT FILTER AND ADSORBENT ASSEMBLY WITH A DIFFUSION TUBE

FIELD OF THE INVENTION

A self-adhesive vent filter/adsorbent assembly including a diffusion tube is provided which comprises a layer of film that is die cut to form a channel which serves as a diffusion tube; two adhesive layers; at least one filtration layer; and optionally at least one adsorbent layer, the assembly to be mounted within an enclosure to filter particles and unwanted gaseous components from the air which is vented into a sensitive instrumentation enclosure. An outside mounting assembly is also provided.

BACKGROUND OF THE INVENTION

Many enclosures that contain sensitive instrumentation must maintain very clean environments in order to operate properly. Examples include enclosures with sensitive optical surfaces or electronic connections that are sensitive to particles and/or gaseous contaminants that can cause contamination or corrosion. Other examples are data recording devices such as computer hard disk drives that are sensitive to particles, organic vapors, and corrosive vapors. Still other examples include electronic control boxes such as those used in automobiles that are sensitive to moisture buildup as well as contamination from fluids and vapors.

Pressure sensitive adhesive filter assemblies and adsorbent vent assemblies are well known. Diffusion tubes are also common and are incorporated into the filter and adsorbent assemblies in one of two ways. The first common technique involves incorporating the diffusion tube directly into a plastic housing. Such a device is described in U.S. Pat. No. 4,863,499 in which a tortuous path is created between the plastic body portion and plastic cover portion of the assembly. The creation of this tortuous path requires the use of molded plastic channels to be incorporated into the body portions when manufactured. The portions are then ultrasonically welded together, snap locked or adhesively bonded to form a one piece unit.

Similarly U.S. Pat. No. 5,030,260 requires a diffusion plate which becomes part of the lower housing. This diffusion plate is likewise provided with channels that cooperate with other parts of the assembly thus creating a chamber for the air from the outside to enter and then diffuse through before entering the chamber.

The limitations of these types of assemblies are numerous. Initial costs to create the molds for plastic injection and molded parts are expensive. In addition, because the chambers or tortuous path created in either of these devices are formed by the cooperation of the different component parts, the elements such as the channel built within the component part must be made precisely. Moreover, the size and spacing of these assemblies has become increasingly critical as miniaturization of control boxes and data storage devices has increased. For example, computer disk drives have decreased in size from 5.25 inches (133.4 mm) disks down to 1.3 inches (33 mm) disks. The space available for a diffusion tube filter/adsorbent assembly has significantly diminished thereby severely limiting the availability for use of the molded plastic type filter assemblies.

An alternate diffusion filter assembly involves creating a groove directly onto the external surface of the housing enclosure and then covering this groove with a planar surface. Again significant cost and feasibility limitations are present. The housing typically is constructed from aluminum, stainless steel, polyvinyl chloride, polycarbonate, or other moldable metal or polymer. The addition of a groove into any of these materials is very costly and labor intensive. Moreover, since the diffusion tubes effectiveness is dependent on the size of the groove or tube through which the air passes, it is important that the groove be small in diameter. The precision of this groove as well as the limited flexibility and versatility further limits the usefulness of this technique.

Finally, retrofitting an existing enclosure with a diffusion groove is both infeasible and cost prohibitive.

There is a need for an improved and miniaturized filter/adsorbent assembly having a diffusion tube that increases protection from harmful particulate and vapor contamination in an enclosure that can be easily applied or retrofitted to an enclosure that has an existing vent hole opening.

SUMMARY OF THE INVENTION

A self-adhesive vent filter assembly is provided comprising a diffusion tube formed being a channel formed between an inner wall of an enclosure and a laminate mounted thereto, the laminate comprising an adhesive layer, a non-outgasing polymer film layer and a second adhesive mounting layer, the laminate having a first large opening across the second mounting adhesive and polymer layers and a second smaller opening across the first adhesive layer wherein the smaller opening is superimposed over the large opening and a filter layer in laminar relation with the laminate and superimposed over the second smaller opening. An adsorbent media layer located in laminar relation between the filter layer and laminate is also provided. Various polymeric materials may be used in the laminate. Various filter materials may be used for the filtration layer. Various chemisorbers and physiosorbers may be used in the adsorbent layer. An exterior mountable vent filter assembly is also provided.

DETAILED DESCRIPTION OF THE PREFERRED EMBODIMENTS

The present invention provides a self-adhesive vent filter/adsorbent assembly with a thin profile diffusion tube for use within an interior enclosure or on the outside of a sensitive optical or electronic equipment enclosure. This assembly is capable of removing particulate and vapor contaminants from air entering the enclosure. Because of the features of the vent filter, including the miniature size, cost and ease of installation, contaminants are easily removed without any interference to the operation of the optics or electronics of the enclosure. The assembly is easily retrofitted for existing enclosures to quickly and easily upgrade the protection for the enclosure.

Specific applications include data storage devices such as computer hard disk drives, optical drives, magneto-optical drives and removable storage drives, sensitive optical systems such as cameras, optical detection devices such as microscopes or electron microscopes and venting of fiber optic junctions, sensitive electronic equipment susceptible to dirt, vapor films or corrosion such as automobile electronic control units, mobile communication or location devices, and other electronic monitoring or controlling devices, and sensitive corrosion prone components of any nature that can decay, erode, or diminish in effectiveness or value by being in contact with particles or vapor contaminants yet still need to be vented to the outside environment to provide a controlled venting or equilibration of pressure.

Figure 1:
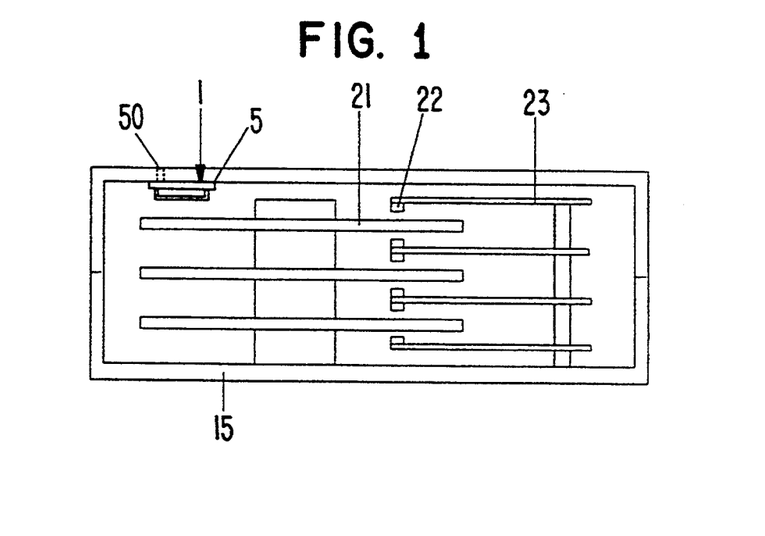
FIG. 1 is a schematic drawing of the interior of a data storage hard disk drive showing the inside mounted version of the assembly in place.

Referring to FIG. 1, the assembly 1 is shown within the enclosure 15 of a computer hard disk drive which needs protection from particulates and harmful vapors. Here the thin vent filter assembly I with diffusion tube or channel 5 is placed over a hole 50 on the inside of the enclosure 15, typically but not necessarily over a low pressure point, such that air can enter into the enclosure, equilibrate pressure and filter particulates from the air via the filter media and unwanted vapor contamination via the diffusion tube and the adsorbent filter media. FIG. 1 also shows the magnetic storage disks 21 read/write head 22, and armature 23 used to control the position of the read/write head over the recording media.

Figure 2:
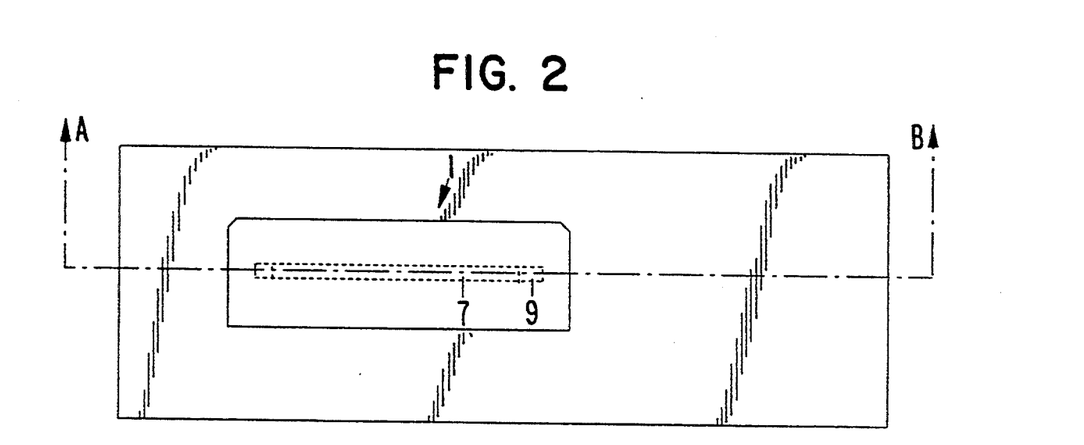
FIG. 2 is a top view of the assembly having a straight diffusion tube channel.
Figure 2A:
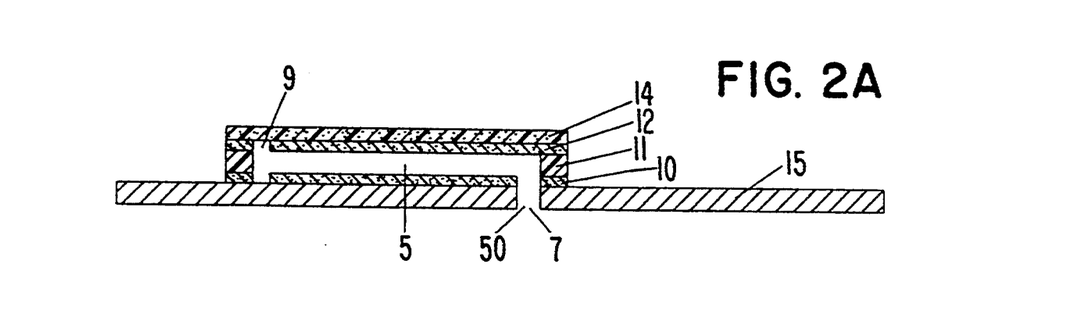
FIG. 2a is a cross-sectional view of FIG. 2 taken along line A-B showing the core components of the assembly.

FIG. 2A shows in cross-section the core components comprising the vent filter/adsorbent assembly. The core components include a filter layer 14 and a diffusion tube 5 constructed from a film layer 11 laminated to a first adhesive layer 12 and a second adhesive layer 10 which also serves as a mounting layer. Variations in the position of these basic components as well as additional components are within the scope of this invention. The finished assembly 1 is aligned over the vent hole 50 of the housing enclosure 15 and adhered thereto by adhesive layer 10.

Figure 2B:
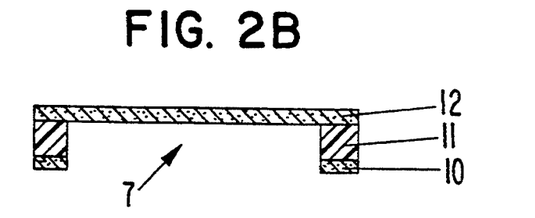
FIG. 2b is an enlarged cross-sectional view of FIG. 2 taken along line A-B of only the diffusion tube region of the assembly.
Figure 2C:
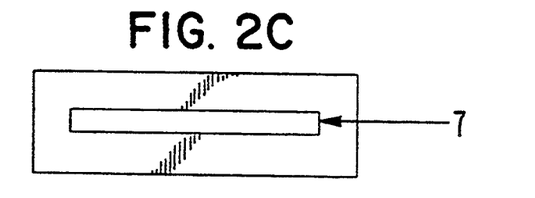
FIG. 2c is a top view of FIG. 2B.

The diffusion tube 5 is preferably constructed from a polymer film 11 that has been laminated on one side to a layer of adhesive 10 as can be seen in the enlarged cross-section of the diffusion tube in FIG. 2b. An opening 7 in the diffusion tube 5 is die cut through the film and the adhesive layer 10 as shown in the top view FIG. 2c. A second layer 6f adhesive 12 is then laminated to the non-laminated side of the polymer film 11 (thus sandwiching polymer film 11 between two adhesive layers). The second layer of adhesive 12 also covers the die cut opening.

Figure 2D:
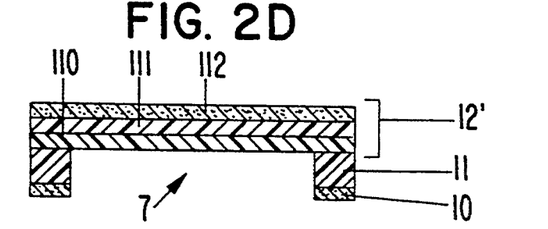
FIG. 2d is an enlarged cross-sectional view of an alternate embodiment of FIG. 2B wherein the adhesive layer 12 is replaced with a plurality of layers 111 and 112.

Alternatively, and as shown in FIG. 2d, the second layer of adhesive 12 may be replaced with a laminate 12' further comprising a layer of adhesive 112, a polymer substrate 111 preferably of a polyester film such as Mylar ® commercially available from E. I. dupont de Nemours, Inc. having a thickness of 0.002 inches (0.005 cm) and a layer of polymer film 110. The laminate 12' is placed on the non-laminated side of the polymer film 11 and is positioned so as to cover the top of the opening 7.

Figure 2E:
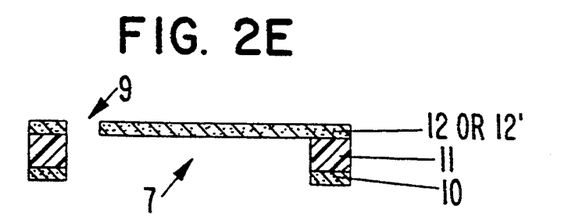
FIG. 2e is an enlarged cross-sectional view of the diffusion tube region showing an enlarged opening and a smaller opening in accordance with the present invention.

A smaller opening 9 is then die cut through layer 12 or 12' but only spans a small portion of the opening 7 of the other layers. This smaller opening 9 is shown in FIGS. 2a and 2e.

A filter media 14 is then placed directly over the second adhesive layer 12 or 12' (as shown in FIG. 2a). The outside dimensions of the layers 10, 11, and 12 are then die cut so that all layers have the same outside filter dimension.

No openings are cut in the filter layer 14. The completed assembly is then positioned over a vent hole of the enclosure housing and adhered to the housing by the adhesive layer 10 as shown in cross-section in FIGS. 2a and b and top view in FIG. 2.

The polymer film 11 used in the construction of the diffusion tube channel 5 may include polyester, polypropylene, nylon, polycarbonate, polyvinyl chloride, and polyvinyl acetate. Any other polymer film that does not outgas hazardous chemical vapors is also suitable for use. A preferred polymer film is Mylar ® film, a polyester commercially available from E. I. dupont de Nemours, Inc. The thickness and effectiveness of the diffusion tube is dependent on the thickness of the film 11 and adhesive layer 12. The effectiveness of the diffusion tube 5 is also dependent on the width of the opening 7 and length of the tube created. These parameters affect the diffusion rate capability and resistance to airflow presented by the diffusion tube.

The film must not be too thin or too wide as the two adhesive layers on both sides of the polymer film may come into contact and occlude the passageway thereby eliminating any venting potential. The occlusion potential becomes severe when the thickness of the film is less than the sum of the thicknesses of the two adhesive layers 10 and 12 and the width is in excess of 0.125" (0.318 cm) wide. Thus, the preferred film 11 has a thickness greater than 0.001 inches (0.0025 cm) with an adhesive layer of about 0.0005 inches (0.0013 cm) for tubes that are greater than 0.125 inches 0.318 cm) wide. The preferred thickness of the polymer film is about 0.005 inches (0.0127 cm) thick which is capable of providing good diffusion collection capability as well as reasonable resistance to airflow and protection against occlusion of the tube by the adhesive.

The adhesive layers (10 and 12) may be either a single layer of transfer type adhesive or double-sided adhesive coated onto a carrier film such as polyester or polypropylene. Alternatively, one layer of adhesive may be coated directly onto the film layer 11 and the second layer of adhesive 12 be either on a transfer tape or double-sided tape. The adhesive must have a high enough peel strength to withstand application use and meet any use specifications that may exist such as high temperature, solvent resistance, FDA approval, repositionable, or low outgassing specifications. A typical low outgassing specification is to pass ASTM E-595-84 specification of less than 1% total mass loss and 0.1% collected volatile condensable material. A preferred embodiment utilizes one layer of 0.001" (0.0025 cm) thick permanent acrylic pressure sensitive adhesive applied to the outer side of the film and a second layer of double-sided permanent acrylic pressure sensitive adhesive 0.004" (0.010 cm) thick for the inner most adhesive which contacts the filter material and adsorbent. This adhesive has medium to high peel strengths in excess of 20 ounces-/inch as measured by PSTC #1 (FTMI) and passes outgassing ASTM E-595-84 specification. A commercially available transfer adhesive is 3M 9457 and a commercially available double-sided adhesive is 3M 415 which both employ an A-40 acrylic adhesive all commercially available from Minnesota Mining Manufacturing, Inc. of Minneapol is, Minn.

The filter media must have a collection efficiency over a wide range of particle sizes including submicron to macroscopic sizes (preferably greater than or equal to 0.02 micrometers). Many adequate filter medias currently exist and have adequate flow and resistance properties that are required. Typical medias include microfiberglass media, high efficiency electret materials, and membrane materials such as, but not limited to, expanded polytetrafluoroethylene membrane, polypropylene membrane, nylon membrane, polycarbonate and polyester membranes, mixed-esters of cellulose membrane, polyvinyl chloride membrane, cellulose triacetate membrane, and thin film composite membranes and/or laminates thereof. The most preferred filtering layer is expanded polytetrafluoroethylene (PTFE) because of its good filtration performance, conformability to cover adsorbent layers, and cleanliness. A preferred expanded PTFE membrane has a filtration efficiency of99.99% at 0.1 micrometer diameter sized particles with a resistance to airflow of approximately 20 mm water column at an airflow of 10.5 feet per minute face velocity. Expanded PTFE is commercially available under the registered trademark GORE-TEX ® of W. L. Gore & Associates, Inc.

Figure 3:
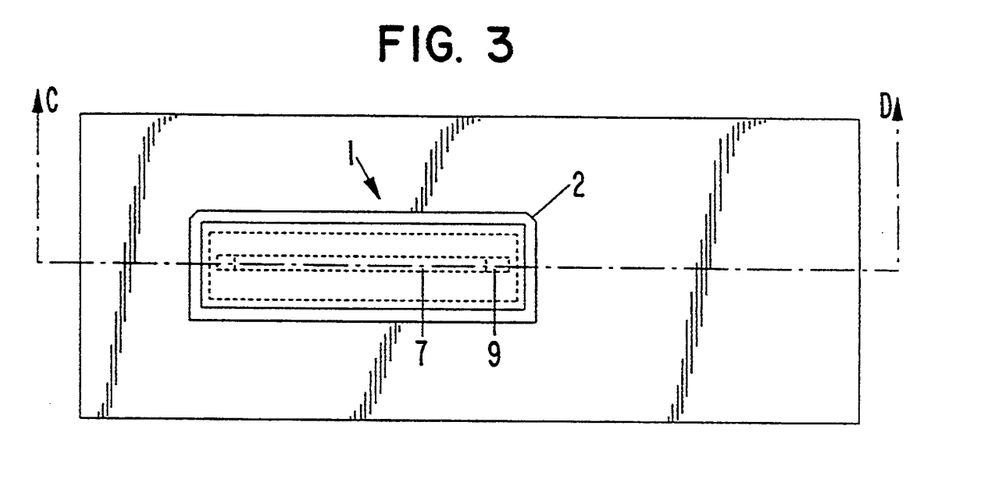
FIG. 3 is a top view of the assembly having an adsorbent media layer within the assembly as well as the other core components.
Figure 3A:
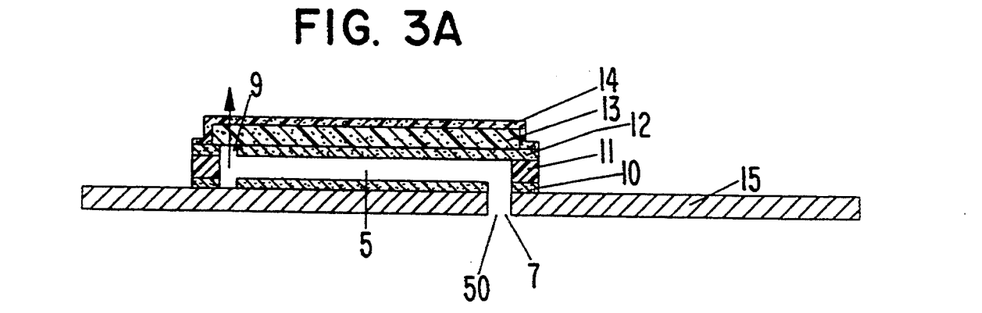
FIG. 3a is a cross-sectional view of FIG. 3 taken along line C–D.
Figure 3B:
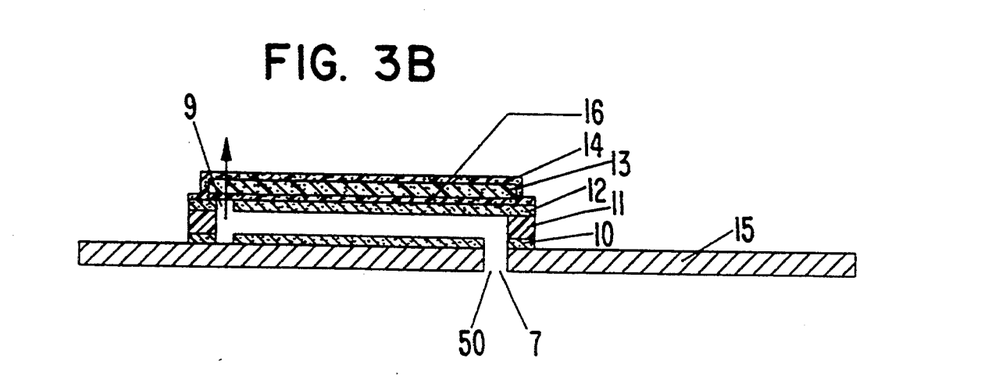
FIG. 3b is a cross-sectional view of FIG. 3 taken along line C–D showing an optional second filter layer that is used to encapsulate the adsorbent media-between the filter and adhesive layers.

FIGS. 3, 3a, and 3b show the vent assembly with diffusion tube similar to the construction shown in FIG. 2a but also includes an adsorbent media layer 13. An adsorbent media layer is necessary where a gas is expected to enter the enclosure from the outside environment and contaminate the sensitive equipment within the enclosure. The adsorbent media layer 13 is laminated on top of the adhesive layer 12 so that it is sandwiched between the adhesive layer 12 and the filter layer 14 as shown in FIG. 3a.

The adhesive layers 10 and 12 as well as the polymer film layer 11 and filter layer 14 are constructed from the same materials as described above for the assembly not containing the adsorbent media layer 13.

The adsorbent media layer 13 may be selected from a broad range of adsorbents and is tailored to the particular gas or gases that are of concern. These gases include water vapor, dioctyl phthalate, silicone, chlorine, hydrogen sulfide, nitrogen dioxide, mineral acid gases, hydrocarbon compounds and any other gas that can oxidize or cause corrosion of any critical element or that can condense onto critical elements so as to effect their operation.

The adsorbent media selected may be of a single type or a combination of different adsorbent medias. It may be a specifically selected adsorbent that targets a specific gas or may be a broad based adsorbent that has good adsorption properties over a wide range of gases.

Adsorbent materials include physisorbers such as, but not limited to, silica gel, activated carbon, activated alumina, molecular sieves, or drying agents such as clays or super adsorbent fibers; or chemisorbents such as, but not limited to, calcium carbonate, calcium sulfate, potassium permanganate, sodium carbonate, potassium carbonate, sodium phosphate, powdered or activated metals or other reactants for chemically reacting and scavenging gas phase corrodents or contaminants.

If a combination of adsorbents are used they may be individual layers that are positioned on top of each other, or mixed into one layer. Alternatively, the adsorbent media may be one that has been impregnated with one or more additional adsorbents such as, but not limited to, activated carbons, silica gels or aluminas that have been impregnated with one or more chemisorbents as mentioned above. A preferred broad range adsorbent is activated carbon with a wide pore size distribution that has been impregnated with one or more chemisorbents such as calcium carbonate or sodium carbonate. Not all of the carbon's pores need be taken up with the impregnation. To create a broad based physisorbent, a wide pore size distribution may be used to provide for a broad range of gasses to be adsorbed. The carbonates are typically good impregnation candidates because the compounds being released due to the chemical reaction of the chemisorbents are carbon dioxide, oxygen, and water. A preferred adsorbent for a given contaminant depends upon the contaminant, the pore size of the physisorbent and chemical composition of the chemisorber that is selected so as to optimize performance on that particular contaminant.

The adsorbent media layer(s) may include, but is not limited to, one or more of the following constructions: 100% adsorbent material such as a granular adsorbent, a carbonized woven or nonwoven material, an adsorbent impregnated nonwoven such as cellulose or polymeric nonwoven that may include latex, acrylic or some other binder system, porous cast adsorbents that may include polymers or ceramics to keep their porous structure, adsorbent impregnated polymers or polymer membranes that serve as a porous scaffold in which void spaces within the scaffold are filled with an adsorbent. Polymeric scaffolds include, but not be limited to, expanded PTFE membranes, polypropylene membranes, polyethylene membranes, polyvinylidene fluoride membranes, polyvinyl alcohol membranes, poly(ethylene teraphthalate) membranes and membranes from any other polymer that can be made to have a node and fibril structure. The adsorbent material may be entirely of one type or a mixture of any number of physisorbers and/or chemisorbers.

A preferred embodiment for the scaffold of the adsorbent media 13 is the use of expanded porous polytetrafluoroethylene (PTFE) made in accordance with the teachings of U.S. Patent Nos. 3,953,566, and 4,187,390, commercially available from W. L. Gore & Associates, Inc. This membrane has a matrix structure that is capable of impregnation with one or more adsorbent materials. The impregnated PTFE is particularly desirable because the adsorbent material is well contained so as to minimize any shedding and is done without the use of binders that may later outgas and cause problems. A layer of impregnated PTFE is also desirable because it can be made extremely thin having a thickness of less than 0.001 inches (0.0025 cm) thus being adaptable to fit extremely low profile applications.

The most preferred broad based adsorbent filter layer is a layer of impregnated expanded PTFE where the adsorbent material is an activated carbon with a wide pore size distribution that has been impregnated with one or more chemisorbers such as, but not limited to, calcium carbonate and/or sodium carbonate.

An additional optional filter material 16 may also be included with the adsorbent media layer 13 as shown in FIG. 3b. This optional filter layer 16 is positioned between the adsorbent media 13 and the second adhesive layer 12. This optional filter layer 16 serves as a protective cover to the adsorbent media layer 13 to ensure that no particles of adsorbent are released to block the diffusion tube or to escape into the enclosure during installation.

The entire filter assembly 1 is also provided with notches 2 to ensure proper installation of the assembly within the enclosure (as shown in FIG. 3). FIGS. 3a and 3b also show the direction of air flow through the assembly within the enclosure (upward pointing arrow above opening 9).

FIGS. 2a and 3a–3b show the filter assembly 1 aligned in such a way that the diffusion tube channel entry lines up with the vent hole 50 of the enclosure 15 causing the remainder of the assembly to be positioned in a nonsymmetrical relation to the vent hole.

Figure 4:
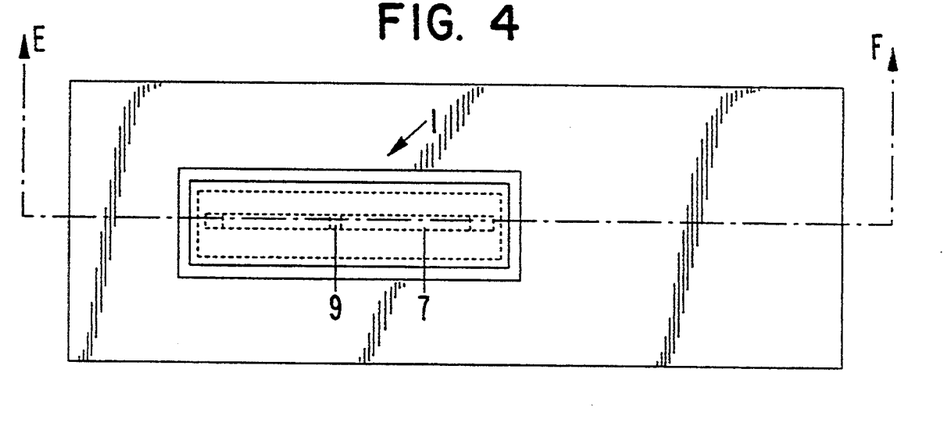
FIG. 4 is a top view of the filter assembly in which the straight diffusion tube is symmetrical about the vent hole.
Figure 4A:
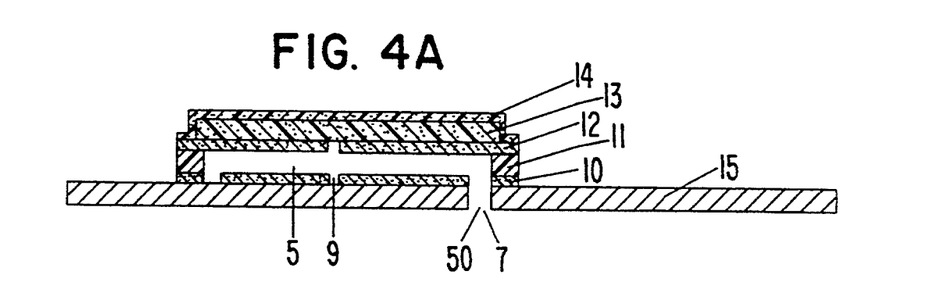
FIG. 4a is a cross-sectional view of FIG. 4 taken along line E–F.

FIGS. 4 and 4a show an assembly having the same layered construction as the assembly shown in FIGS. 3 and 3a except that the diffusion tube 5 is constructed so that the small opening 9 is located at the midpoint along the length of the tube. One of the tube ends is placed over the vent hole of the enclosure. This configuration reduces the effectiveness of the diffusion tube by a factor of two but provides for ease and error free installation because of the symmetry.

Figure 5:
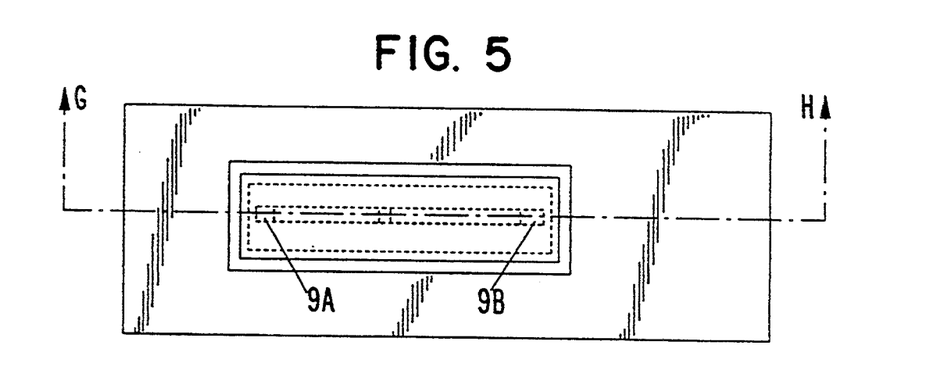
FIG. 5 is another variation of the second embodiment of the filter with adsorbent layer and straight diffusion tube exhibiting symmetry of installation and multiple outlet passages.
Figure 5A:
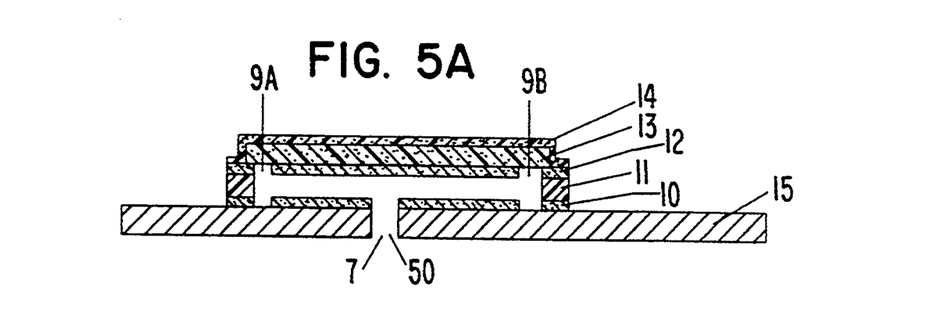
FIG. 5a is a cross-sectional view of FIG. 5 taken along line G–H.

FIGS. 5 and 5a show a construction similar to that of FIGS. 3 and 3a wherein the diffusion tube is centered over the vent hole 50 of the enclosure and wherein the opening 7 the diffusion channel 5 lays over the top of the vent hole 50 and wherein two small openings 9a and 9b provide access of the air to the other layers of the assembly. This configuration provides for better utilization of the adsorbent layer as the air is able to enter through either opening to the adsorbent media 13. This configuration is also useful should one of the access openings 9a or 9b become blocked.

Figure 6:
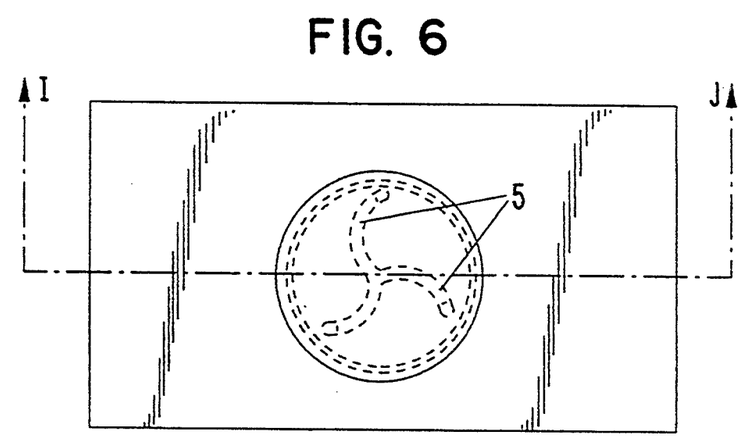
FIG. 6 is a top view of a circular filter with adsorbent layer and a plurality of curved diffusion tubes.
Figure 6A:
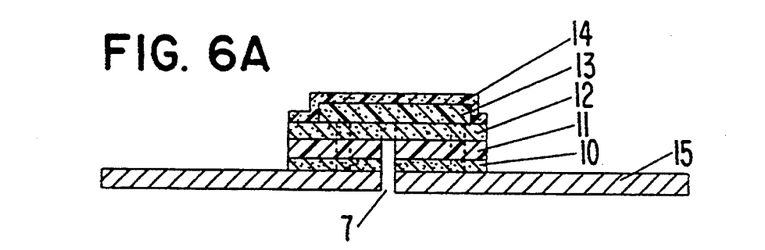
FIG. 6a is a cross-sectional view of FIG. 6 taken along line I–J.

FIGS. 6 and 6a show an assembly having layers similar to those of FIGS. 3 and 3a with plurality of diffusion tubes 5 that connect to a central opening 7. Additional tubes add to the complexity of die cutting but provide additional access to the adsorbent filter and provide continued operation should one of the tubes become blocked.

Figure 7:
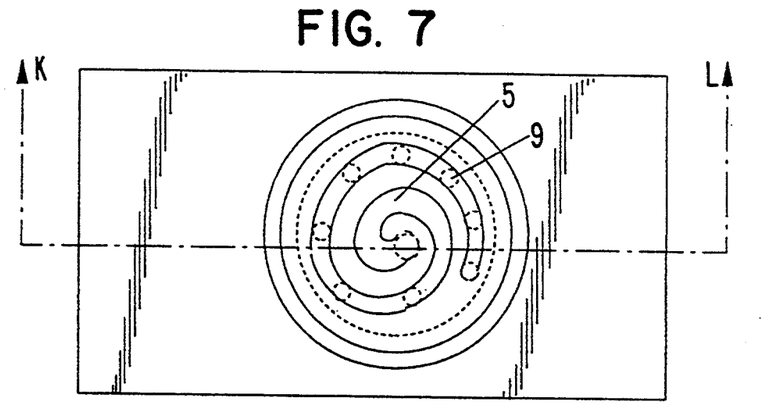
FIG. 7 is another embodiment of the assembly showing in top view the adsorbent layer and an elongated curved diffusion tube with a wide area of distribution through multiple outlet ports.
Figure 7A:
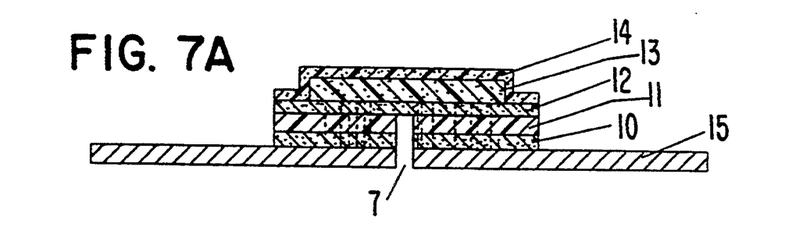
FIG. 7a is a cross-sectional view of FIG. 7 taken along line K–L.

FIGS. 7 and 7a show in top and side views an assembly having a diffusion tube 5 in a single spiral pattern with multiple (eight shown in FIG. 7) openings 9 that allow air to traverse through the second adhesive layer 12 thereby providing increased accessibility to a large area of the adsorbent layer.

Figure 8:
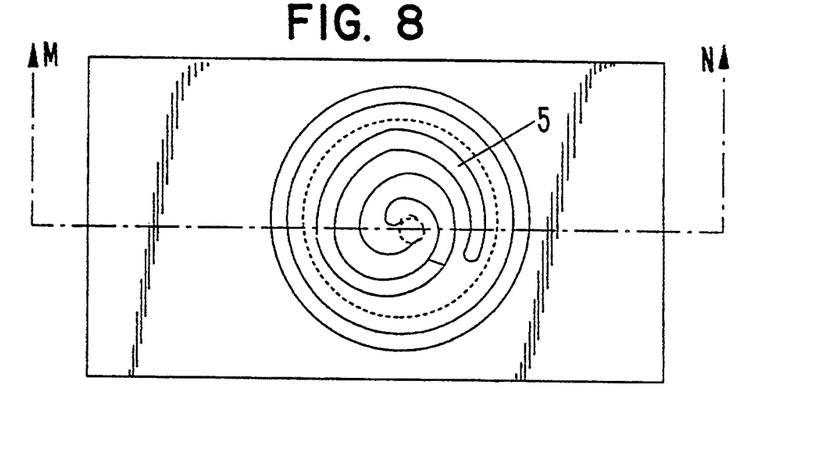
FIG. 8 shows the assembly in top view with an elongated curved diffusion tube having a large area of the tube used as output.
Figure 8A:
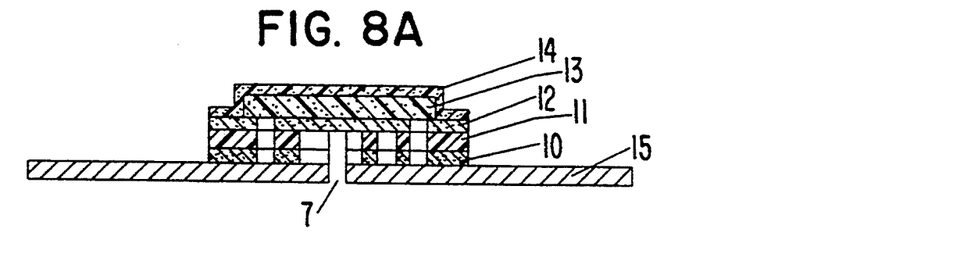
FIG. 8a is a cross-sectional view of FIG. 8 taken along line M–N.

FIGS. 8 and 8a show in top and side views an assembly with maximum adsorbent usage and minimum resistance to airflow. Here, an entire section of the diffusion tube 5 is exposed to the adsorbent 13 and filter layers 14 by forming an annular ring across the assembly. Minimum resistance to airflow may be accomplished with this assembly by eliminating the use of the adsorbent layer 13.

Figure 9:
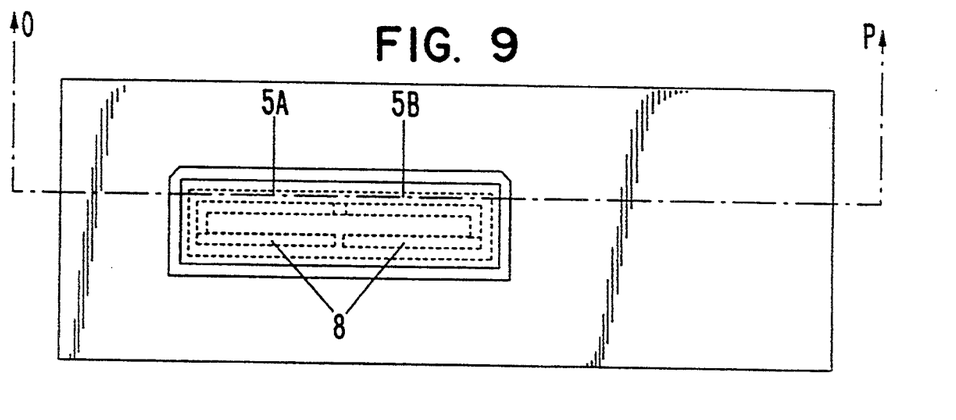
FIG. 9 is an embodiment of the assembly showing in top view a diffusion tube with a central inlet, two diffusion channels and two open slots exposed to the adsorbent filter material and filter media.
Figure 9A:
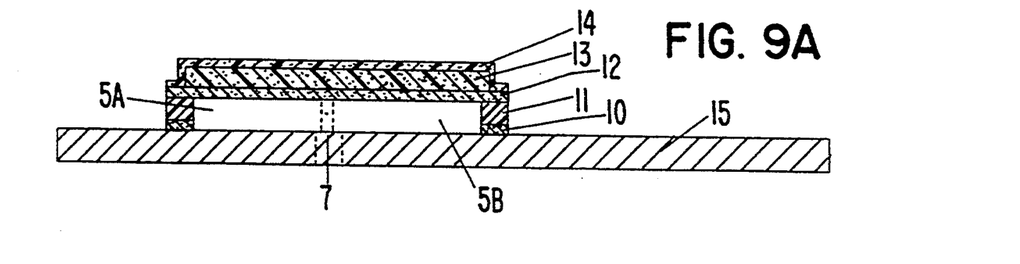
FIG. 9a is a cross-sectional view of FIG. 9 taken along line O–P.

FIGS. 9 and 9a show an assembly with an adsorbent and diffusion tube arrangement with a single opening 7, dual diffusion tube channels 5a & 5b and long access slots 8 along each diffusion channel 5 to give access to the entire length of adsorbent and filter layer thereby maximizing adsorbent usage and providing minimized resistance to airflow. The entire length of adsorbent 13 is utilized and the large surface area minimizes resistance to air flow. The adsorbent layer 13 and filter layer 14 provide resistance to the airflow and work to distribute the airflow over the entire exposed tube area.

In operation, all of the assemblies described above provide for the external air to enter the vent opening 50 of the housing enclosure and to flow through the diffusion tube channel 5 wherein moisture and other contaminants diffuse to the surfaces of channel 5 and are collected by Van der Waals forces. The air then traverses through the opening 9, through the adsorbent media 13 if present where further gaseous contaminants are removed, and through the outer filtration layer 14 where residual particulates are removed. The filtered air then enters the interior of the housing enclosure (as shown by the arrow in FIGS. 3a and 3b).

Figure 10:
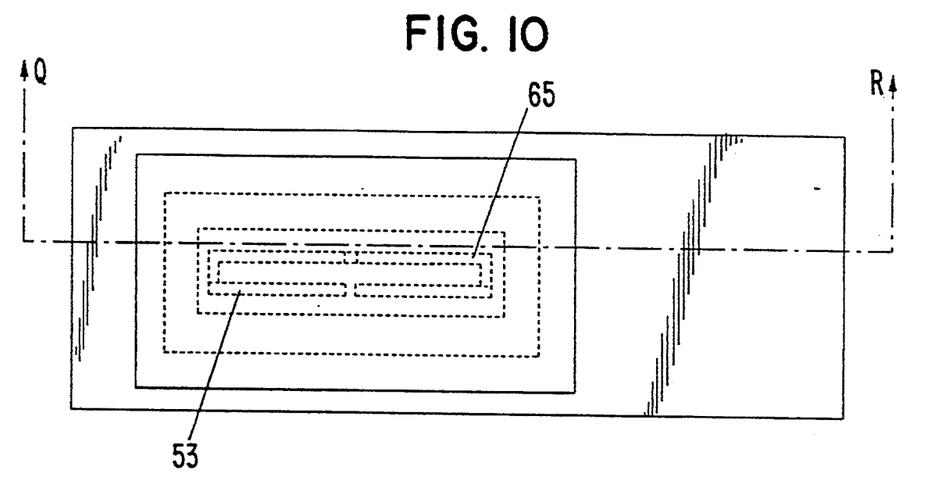
FIG. 10 shows in top view an embodiment of an outside mount of the assembly with diffusion tube assembly containing an adsorbent layer and an impermeable outer layer.
Figure 10A:
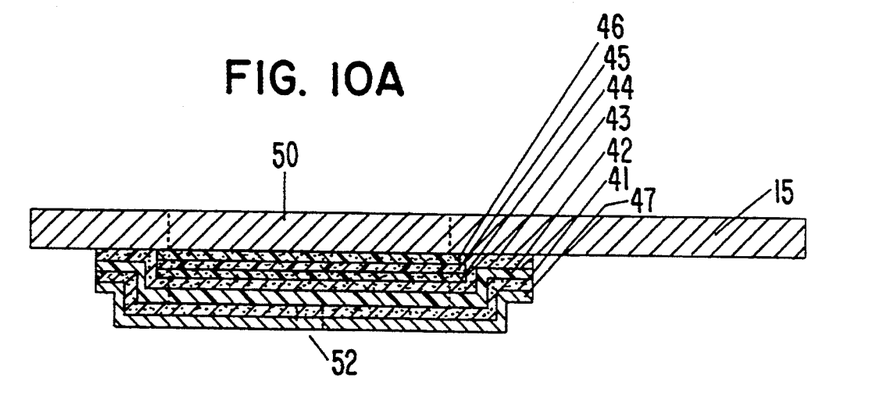
FIG. 10a is a cross-sectional view of FIG. 10 taken along line Q–R.

A second embodiment of the assembly, as shown in FIGS. 10 and 10a, has essentially the same layers as the first embodiment and relates to an assembly which includes an inner layer of filter material 46 that is placed over the vent opening 50 of the enclosure 15. A layer of adsorbent media material 45 is placed on top of the inner filter layer 46 in laminar relationship. An optional second filter material 44 is placed in laminar relation to and on top of the adsorbent media layer 45 and serves as additional protection against any particulate escaping from the adsorbent layer through the diffusion tube and possibly blocking the tube. The diffusion tube channel 65 is then constructed from the next four layers comprising in laminar relation a first adhesive layer 43, a polymer film layer 42, a second adhesive layer 41, and an outer impermeable layer 47 wherein a slot or opening 65 is made in layers 42 and 41 thereby forming a groove or channel through which air that enters the assembly can pass. The first adhesive layer 43 extends beyond the perimeter of the filtration layer 46 and adsorbent layer 45, so that its outer border is in direct contact with the outer surface of the housing enclosure wall. This seals the edge of the adsorbent from the outside environment. An opening or hole 53 is pressed in this adhesive layer to allow access of air from the diffusion tube into the filtration and optional adsorbent layers. The second adhesive layer 41 is in contact with an outer impermeable layer 47. The outer impermeable layer 47 is positioned over the diffusion tube groove and it is this outer layer that is exposed to the environment. An opening or hole 52 is present in the outer impermeable layer. This opening 52 is positioned over the groove in the diffusion tube so that air that enters through the opening or hole 52 subsequently travels through the diffusion tube and through opening 53 to reach the inner filtration layers.

The outer impermeable film 47 serves to cover the adhesive layer 41 and prevent outside contaminants from entering the diffusion channel in any area except through opening 52. It is possible to eliminate this layer if a nonpermeable adhesive layer is used and the opening 52, instead of the groove was cut through the layer but this would leave a tacky adhesive side exposed. The top impermeable film layer 47 further facilitates installation of the assembly onto the enclosure.

The top impermeable layer may be made of metal foil or metallized film thereby providing electromagnetic interference. Metal foils provide improved electromagnetic interference and are more pliable and formable for irregular shaped housing profiles as compared to metallized films. Metallized films however provide more durability and puncture resistance while providing limited shielding capability.

Alternatively this impermeable layer 47 may be transparent such that the adsorbent filter material is visible. Indicator materials may be used with the adsorbent filter in this situation so that when the adsorbent material is saturated, the adsorbent will change color indicating the need for a replacement vent. Many such indicators exist for a wide variety of potentially hazardous pollutants for sensitive equipment in the enclosure. Such indicators include, but are not limited to, cobalt chloride; o-tolidine; $N_1N'$ diphenylbenzidene; and disodium tetrachloromercurate and methyl red, color-changing indicator.

Similar to the assemblies described above, the adsorbent may be eliminated and still have the protection of the diffusion tube and filter media.

EXAMPLE 1

A self-adhesive vent filter similar to that shown in FIGS. 2 and 2a was made having the following features. The filter was rectangular with a total length and width of 2.36 inches (6.0 cm) and 1.57 inches (4.0 cm) respectively. The adhesive layer 10 was a layer of 3M 9457 adhesive commercially available from Minnesota Mining and Manufacturing Inc. of Minneapolis, Minn. The adhesive layer was laminated to a 0.006 inches (0.015 cm) layer of polyester film 11. An opening 7 having the dimensions of 0.118 inches (0.3 cm) width and 1.38 inches (3.5 cm) length was die cut through the laminate. A layer, 12, of 3M 415 adhesive was then laminated to the other side of the 0.006 inch (0.015 cm) polyester film to complete the diffusion tube. A second opening 9 was die cut through this adhesive layer and had a diameter of 0.118 inches (0.3 cm). This second opening was made over one end of the 1.38 inches (3.5 cm) long tube channel.

A final filter layer 14 was constructed of expanded PTFE (GORE-TEX ®) membrane commercially available from W. L. Gore & Associates, Inc.) with a resistance to airflow of 22 mm of water column at an airflow of 10.5 feet per minute (3.2 m/min.).

The final assembly was put onto a housing element with a 0.125 inch (0.32 cm) diameter through-hole such that the end of the diffusion tube that was covered with the adhesive layer 12 was aligned over this through-hole. Air entering the enclosure would pass through the hole and would traverse the length of the diffusion tube channel, pass through the small opening 9 in the second adhesive layer 12 and then pass through the filtration layer 14.

The resistance to airflow of this entire assembly with housing was tested to insure that the airflow passage was not closed off and was measured as 12.5 inches (317 mm) water column at 138 ml/min flow.

EXAMPLE 2

Adsorbent Layer Included

A self-adhesive vent similar to that shown in FIGS. 3 and 3a was made having the following features. The filter was rectangular with a total length and width of 2.36 inches (6.0 cm) and 1.57 inches (4.0 cm) respectively. The adhesive layer 10 was a layer of 3M 9457 adhesive commercially available from Minnesota Mining and Manufacturing Inc. of Minneapolis, Minn. The adhesive layer was laminated to a 0.006 inch (0.015 cm) layer of polyester film 11. An opening 7 having the dimensions of 0.118 inches (0.3 cm) width and 1.38 inches (3.5 cm) length was die cut through the laminate. A layer, 12, of 3M 345 adhesive was then laminated to the other side of the 0.006 inches (0.015 cm) polyester film to complete the diffusion tube. A second opening 9 was die cut through this adhesive layer and had a diameter of 0.118 inches (0.3 cm). This second opening was made over one end of the 1.38 inches (3.5 cm) long tube channel.

A filter layer 16 of expanded PTFE membrane (GORE-TEX ®) membrane) having a filtration efficiency of 99.99% at 0.1 micrometer diameter sized particle and a resistance to airflow of 22 mm water column at an airflow of 10.5 feet per minute (3.2 m/min) was laminated to a layer 13 of expanded porous PTFE membrane that had been impregnated with activated carbon that in turn had been impregnated with a mixture of sodium carbonate and potassium carbonate. This was then laminated to the adhesive layer 12 with the pure expanded PTFE filter against the adhesive such that it was centrally located over the 1.38 inches (3.5 cm) diffusion tube. The length and width of this adsorbent filter media was 2.0 inches (3.1 cm) and 1.18 inches (3.0 cm) respectively.

A final filter layer 14 was constructed of expanded PTFE (GORE-TEX®) membrane commercially available from W. L. Gore & Associates, Inc. and had a filtration efficiency of 99.99% at 0.1 micrometer diameter sized particles and a resistance to airflow of 22 mm of water column at an airflow of 10.5 feet per minute (3.2 m/min).

The final assembly was put onto a housing element with a 0.125 inches (0.32 cm) diameter through-hole such that the end of the diffusion tube that was covered with the adhesive layer 12 was aligned over this through-hole. Air entering the enclosure would pass through the hole and would traverse the length of the diffusion tube channel, pass through the small opening 9 in the second adhesive layer 12 and then pass through the adsorbent layer 13 and filtration layer 14.

The resistance to airflow of this entire assembly with housing was tested to insure that the airflow passage was not closed off and was measured at 35 inches (889 mm) water column at 138 ml/min flow.

We claim:

1. A self-adhesive vent filter assembly comprising:
   (a) a diffusion tube being a channel formed between an inner wall of an enclosure and a laminate mounted thereto;
   (b) the laminate comprising an adhesive layer, a non-outgassing polymer film layer and a second adhesive mounting layer, said laminate having a first large opening across the second mounting adhesive and polymer layers and a second smaller opening across the first adhesive layer wherein the second smaller openings is superimposed over the large opening; and
   (c) a filter layer in laminar relation with the laminate and superimposed over the second smaller opening.

2. A self-adhesive vent filter assembly as described in claim 1 further comprising an adsorbent media layer located in laminar relation and between the filter layer and the laminate.

3. A self-adhesive vent filter assembly as described in claim 2 wherein the polymer film of the laminate is selected from the group consisting of polypropylene, nylon, polycarbonate, polyvinyl chloride, and polyvinyl acetate.

4. A self-adhesive vent filter assembly as described in claim 2 wherein the polymer film is a polyester film.

5. A self-adhesive vent filter assembly as described in claim 2 wherein the filter layer is selected from the group consisting of polypropylene, nylon, a composite of polycarbonate and polyester, mixed cellulose ester, polyvinyl chloride, and cellulose triacetate.

6. A self-adhesive vent filter assembly as described in claim 2 wherein the filter layer is expanded polytetrafluoroethylene.

7. A self-adhesive vent filter assembly as described in claim 2 wherein the adsorbent layer is a physiosorber made from a material selected from the group consisting of silica gel, activated carbon, activated a lumina, molecular sieves, clays and super adsorbent fibers.

8. A self-adhesive vent filter assembly as described in claim 2 wherein the adsorbent layer is a chemisorbent made from a material selected from the group consisting of calcium carbonate, calcium sulfate, potassium permanganate, sodium carbonate, potassium carbonate, sodium phosphate, and activated metals.

9. A self-adhesive vent filter assembly as described in claim 2 wherein the adsorbent is selected from the group consisting of physisorbers, chemisorbers, and combinations thereof 10. A self-adhesive vent filter assembly as described in claim 2 wherein the adsorbent layer is a polymeric scaffold that is impregnated with an adsorbent.

11. A self-adhesive vent filter assembly as described in claim 10 wherein the polymeric scaffold is selected from the group consisting of membranes of polypropylene, polyethylene, polyvinylidene fluoride, polyvinyl alcohol, poly(ethylene teraphthalate) and other polymers capable of creating a membrane having a microstructure of nodes and fibrils.

12. A self-adhesive vent filter assembly as described in claim 10 wherein the adsorbent is selected from the group consisting of physisorbers, chemisorbers, and combinations thereof.

13. A self-adhesive vent filter assembly as described in claim 10 wherein the scaffold is expanded polytetrafluoroethylene.

14. A self-adhesive vent filter assembly as described in claim 1 wherein the polymer film of the laminate is selected from the group consisting of polypropylene, nylon, polycarbonate, polyvinyl chloride, and polyvinyl acetate.

15. A self-adhesive vent filter assembly as described in claim 1 wherein the polymer film is a polyester film.

16. A self-adhesive vent filter assembly as described in claim 1 wherein the filter layer is selected from the group consisting of polypropylene, nylon, a composite of polycarbonate and polyester, mixed cellulose ester, polyvinyl chloride, and cellulose triacetate.

17. A self-adhesive vent filter assembly as described in claim 1 wherein the filter layer is expanded polytetrafluoroethylene.

18. A self-adhesive vent filter assembly as described in claim 1 wherein the diffusion tube further comprises a plurality of diffusion tubes that connect to a central inlet.

19. A self-adhesive vent filter assembly as described in claim 1 wherein the diffusion tube is in the shape of a single spiral pattern with multiple openings.

20. A self-adhesive vent filter assembly as described in claim 1 wherein the diffusion tube is in the shape of an annular ring.

21. A self-adhesive vent filter assembly as described in claim 1 wherein the diffusion tube comprises a dual diffusion tube channel having long access slots along each diffusion channel.

22. A self-adhesive exterior mountable vent filter assembly for use with an enclosure comprising:
   (a) a diffusion tube comprising a channel formed between an outer impermeable layer and a laminate mounted thereto;
   (b) the laminate comprising a first mounting adhesive layer, a non-outgassing polymer film layer and a second adhesive layer, said laminate having a first large opening across the second adhesive layer and polymer layers and a second smaller opening across the first adhesive layer wherein the second smaller opening is superimposed over the large opening;
   (c) a filter layer in laminar relation with the laminate and superimposed over the second smaller opening; and
   (d) an outer layer of impermeable film located in laminar relation to and adjacent the second adhesive layer of the laminate wherein an opening is located in the outer impermeable film layer so that air may enter the enclosure.

23. A self-adhesive vent filter assembly as described in claim 22 wherein the impermeable film is selected from the group consisting of metal foils and metallized films.

24. A self-adhesive vent filter assembly as described in claim 23 further comprising an adsorbent media layer located in laminar relation and between the filter layer and the laminate.

25. A self-adhesive vent filter assembly as described in claim 22 further comprising an adsorbent media layer located in laminar relation and between the filter layer and the laminate.

26. A self-adhesive vent filter assembly as described in claim 25 wherein the impermeable film is a transparent film and the adsorbent media layer contains an indicator.

27. A self-adhesive vent filter assembly as described in claim 26 wherein the indicator is selected from the group consisting of cobalt chloride, o-tolidine, $N_1N'$ diphenylbenzidene, disodium tetrachloromercurate, and methyl red color-changing indicators.

28. A self-adhesive vent filter assembly as described in claim 25 wherein the adsorbent is selected from the group consisting of physisorbers, chemisorbers, and combinations thereof.

29. A self-adhesive vent filter assembly as described in claim 25 wherein the adsorbent media layer is a polymeric scaffold that is selected from the group consisting of expanded polytetrafluoroethylene, polypropylene, polyethylene, polyvinylidene fluoride, polyvinyl alcohol, or poly(ethylene teraphthalate) that has been impregnated with an adsorbent or combination of adsorbents.

30. A self-adhesive vent filter assembly as described in claim 22 wherein the non-outgassing polymer film is selected from the group consisting of polyester, polypropylene, nylon, polycarbonate, polyvinyl chloride, and polyvinyl acetate.

31. A self-adhesive vent filter assembly as described in claim 22 wherein the filter layer is selected from the group consisting of expanded polytetrafluoroethylene, polypropylene, nylon, a composite of polycarbonate and polyester, mixed cellulose ester, polyvinyl chloride and cellulose triacetate.

* * * * *